(12) United States Patent
Haggerty et al.

(10) Patent No.: US 12,229,584 B2
(45) Date of Patent: Feb. 18, 2025

(54) PLATFORM AND SOURCE AGNOSTIC DATA PROCESSING FOR STRUCTURED AND UNSTRUCTURED DATA SOURCES

(71) Applicant: Capital One Services, LLC, McLean, VA (US)

(72) Inventors: Timothy Haggerty, Henrico, VA (US); Yuting Zhou, Reston, VA (US); Venu Kumar Nannapaneni, Glen Allen, VA (US); Pravin Nair, Addison, TX (US); Hussein Ali Khalif Samao, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/404,017

(22) Filed: Jan. 4, 2024

(65) Prior Publication Data

US 2024/0176648 A1     May 30, 2024

Related U.S. Application Data

(63) Continuation of application No. 17/357,710, filed on Jun. 24, 2021, now Pat. No. 11,900,149.

(51) Int. Cl.
*G06F 9/44*     (2018.01)
*G06F 9/48*     (2006.01)
*G06F 16/25*    (2019.01)

(52) U.S. Cl.
CPC ............... *G06F 9/48* (2013.01); *G06F 16/25* (2019.01)

(58) Field of Classification Search
CPC ........................................................ G06F 9/48

USPC .......................................................... 718/102
See application file for complete search history.

(56) References Cited

U.S. PATENT DOCUMENTS

| 10,402,397 | B1 | 9/2019 | Bagdis et al. |
| 2018/0218046 | A1 | 8/2018 | Woo |
| 2019/0258635 | A1 | 8/2019 | Pal et al. |

(Continued)

OTHER PUBLICATIONS

Sanjay Chawla et al., "Building your Cross-Platform Application with RHEEM" Qatar Computing Research Institute, Hamad Bin Khalifa University, Hasso Plattner Institute, University of Potsdam, Website: https://arxiv.org/pdf/1805.11723.pdf, May 29, 2018.

(Continued)

*Primary Examiner* — Timothy A Mudrick
(74) *Attorney, Agent, or Firm* — Banner & Witcoff, Ltd.

(57) ABSTRACT

Data queries that are agnostic to any particular data source may include a data source alias. The data source alias may be replaced with a data source identifier to obtain a data query configured for a target data source. Data processing jobs may be agnostic to any particular data processing platform. A data processing job may include a data processing task that is agnostic to any particular data processing platform. A code library may provide platform-specific code configured to implement a data processing task on a data processing platform. A data query configured for a particular data source and a data processing task configured for a particular data processing platform may be used to create a data processing job. Configurations that restrict execution of a data processing job to execution via an interactive development environment may be removed to allow its execution directly at the data processing platform itself.

20 Claims, 7 Drawing Sheets

(56) References Cited

U.S. PATENT DOCUMENTS

2019/0272271 A1 9/2019 Bhattacharjee et al.
2022/0413897 A1 12/2022 Haggerty et al.

OTHER PUBLICATIONS

Essam Mansour et al., "Building Data Civilzer Pipelines with an Advanced Workflow Engine" 2018 IEEE 34th International Conference on Data Engineering (ICDE), XP033426880, Apr. 16, 2018, pp. 1593-1596.

Ionel Gog et al., "Musketeer: all for one, one for all in data processing systems" Mobisys '15: Proceedings of the 13th Annual International Conference on Mobile Systems, Applications, And Services, ACM XP058510756, Apr. 17, 2015, pp. 1-16.

Oct. 21, 2022—(WO) International Search Report and Written Opinion—App No. PCT/US2022/034637.

Divy Agrawal et al., "RHEEM: Enabling Cross-Platform Data Processing" Proceedings of the VLDB Endowment Association of Computing Machinery, vol. 11, No. 11, XP058413460, Jul. 1, 2018, 14 pages.

Divy Agrawal et al., "RHEEM: Enabling Multi-Platform Task Execution" The 2021 12th International Conference on E-Business, Management and Economics, XP058880913, Jun. 26, 2016, 4 pages.

Sebastian Kruse et al., "RHEEMix in the Data Jungle: A Cost-based Optimizer for Cross-Platform Systems" ARXIV.org, Cornell University Library, XP081755169, Sep. 5, 2020, 16 pages.

Ji Lucas et al., "RheemStudio: Cross-Platform Data Analytics Made Easy" 2018 IEEE 34th International Conference on Data Engineering, XP033426922, Apr. 16, 2018, pp. 1573-1576.

PLATFORM AND SOURCE AGNOSTIC DATA PROCESSING FOR STRUCTURED AND UNSTRUCTURED DATA SOURCES

CROSS-REFERENCE TO RELATED APPLICATIONS

This application is a continuation of U.S. patent application Ser. No. 17/357,710 titled "Platform and Source Agnostic Data Processing for Structured and Unstructured Data Sources" and filed on Jun. 24, 2021, which is incorporated by reference herein in its entirety.

TECHNICAL FIELD

The present disclosure is generally related to creating data queries and data processing jobs that are source and platform agnostic.

BACKGROUND

Data science is a multi-disciplinary technical field that seeks to derive knowledge and meaning from data. Achieving this goal may involve input from a team of individuals operating in different roles. Such roles may include data analysts, data engineers, and data scientists. Each role may involve core responsibilities and skills sets, although there can be overlap across roles. Data engineers, for example, may be responsible for the development and maintenance of data architectures including the preparation, storage, and transfer of data. Data analysts may be responsible for interpreting and describing the data including retrieving data of interest, identifying trends, and preparing data visualizations. Data scientists may be responsible for deriving meaning and insights from data to help guide decision-making.

Challenges arise, however, when using multiple data sources and data processing platforms to store and process data. Data sources may store data differently. Data processing platforms may have different capabilities. Further, different individuals may possess different skill sets leading to individual preferences for accessing and processing the data.

Some users, for example, may prefer to use interactive development environments to facilitate their access to and processing of the data. Others, however, may prefer to have more direct access to the data and its processing without the use of an interactive development environment. This can lead to redundant efforts when creating artifacts used to access data from a particular data source that cannot be reused to access data from another data source or used to process data on a particular data processing platform that cannot be reused on other data processing platforms. Solutions to these inefficiencies are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Data queries that are agnostic to any particular data source may include a data source alias. The data source alias may be replaced with a data source identifier to obtain a data query configured for a target data source. Data processing jobs may be agnostic to any particular data processing platform. A data processing job may include a data processing task that is agnostic to any particular data processing platform. A code library may provide platform-specific code configured to implement a data processing task on a data processing platform. A data query configured for a particular data source and a data processing task configured for a particular data processing platform may be used to create a data processing job. Configurations that restrict execution of a data processing job to execution via an interactive development environment may be removed to allow its execution directly at the data processing platform itself.

Systems and methods for generating and executing platform-agnostic processing jobs are disclosed. In one embodiment, a computer-implemented method includes receiving a platform-agnostic data processing job including at least one platform-agnostic data processing task, receiving a data source-agnostic data query including a data source alias, creating, for a target data source, a data source-specific data query at least by replacing, using an alias mapping and based on the target data source, the data source alias with a data source identifier that indicates the target data source, obtaining, for a target data processing platform and based on the at least one platform-agnostic data processing task, at least one platform-specific data processing task, creating, for the target data processing platform and using the data source-specific data query and the at least one platform-specific data processing task, a restricted platform-specific data processing job that is restricted to execution within an interactive development environment (IDE) connected to the target data processing platform, obtaining an unrestricted platform-specific data processing job configured for execution outside of the IDE at least by removing, from the restricted platform-specific data processing job, one or more configurations that restrict execution of the restricted platform-specific data processing job to execution within the IDE, and causing execution, outside of the IDE, of the unrestricted platform-specific data processing job at the target data processing platform, wherein the target data processing platform accesses, during execution of the unrestricted platform-specific data processing job and based on the data source-specific data query, the target data source.

In yet another embodiment of the invention, the obtaining the at least one platform-specific data processing task includes retrieving, from a code library, platform-specific code configured to perform at least one data processing task at the target data processing platform, wherein the code library includes first code configured to perform the at least one data processing task at a first data processing platform of a first type and second code configured to perform the at least one data processing task at a second data processing platform of a second type that is different from the first type.

In still another embodiment of the invention, the computer-implemented method further includes causing execution, within the IDE, of the restricted platform-specific data processing job.

In yet still another embodiment of the invention, the removing the one or more configurations from the restricted platform-specific data processing job includes modifying at least one of the one or more configurations of the restricted platform-specific data processing job.

In yet another additional embodiment of the invention, the removing the one or more configurations of the restricted platform-specific data processing job includes removing, from the restricted platform-specific data processing job, at least one of at least one formatting element associated with the IDE, at least one input element associated with an input function of the IDE, or at least one output element associated with an output function of the IDE.

In still another additional embodiment of the invention, the computer-implemented method further includes storing, in a version control repository, at least one of the platform-agnostic data processing job or the data source-agnostic data query, wherein the version control repository is accessible to each of a data processing job development environment and a data processing job production environment, wherein each of the platform-agnostic processing job and the data source-agnostic data query are received from the version control repository.

In yet still another additional embodiment of the invention, the creating the platform-specific data processing job includes creating the platform-specific data processing job further using a view definition that defines, for the target data source, a first data view that corresponds to a second data view of a second data source.

In yet another embodiment of the invention, the at least one data processing task includes at least one of an extraction task, a transform task, a formatting task, an encryption task, a tokenization task, and a scheduling task.

In still another embodiment of the invention, the alias mapping includes a first mapping between a first data source alias and a first data source identified of a first data source including a data warehouse of structured data and a second mapping between a second alias and a second data source identifier of a second data source including a data lake of unstructured data.

Yet another embodiment of the invention includes a system including a first data source including a data warehouse of structured data, a second data source including a data lake of unstructured data, a code library including first code configured to perform at least one data processing task at a first data processing platform of a first type and second code configured to perform the at least one data processing task at a second data processing platform of a second type that is different from the first type, one or more processors, and memory storing computer-readable instructions that, when executed by the one or more processors, cause the system to receive a platform-agnostic data processing job including at least one platform-agnostic data processing task, receive a data source-agnostic data query including a data source alias, create, for a target data source, a data source-specific data query at least by replacing, using the alias mapping and based on the target data source, the data source alias with a data source identifier that indicates the target data source, obtain, for a target data processing platform and based on the at least one platform-agnostic data processing task, at least one platform-specific data processing task at least by retrieving, from the code library, platform-specific code configured to perform the at least one data processing task at the target data processing platform, create, for the target data processing platform and using the data source-specific data query and the at least one platform-specific data processing task, a restricted platform-specific data processing job that is restricted to execution within an interactive development environment (IDE) connected to the target data processing platform, obtain an unrestricted platform-specific data processing job configured for execution outside of the IDE at least by removing, from the restricted platform-specific data processing job, one or more configurations that restrict execution of the platform-specific data processing job to execution within the IDE, wherein the one or more configurations removed from the platform-specific data processing job include at least one of at least one formatting element associated with the IDE, at least one input element associated with an input function of the IDE, or at least one output element associated with an output function of the IDE, and cause execution, outside of the IDE, of the unrestricted platform-specific data processing job at the target data processing platform, wherein the target data processing platform accesses, during execution of the unrestricted platform-specific data processing job and based on the data source-specific data query, the target data source.

In yet another embodiment of the invention, the instructions, when executed by the one or more processors, further cause the system to remove the one or more configurations of the restricted platform-specific data processing job at least by modifying at least one of the one or more configurations of the restricted platform-specific data processing job.

In still another embodiment of the invention, the instructions, when executed by the one or more processors, further cause the system to store, in a version control repository, at least one of the platform-agnostic data processing job or the data source-agnostic data query, wherein the version control repository is accessible to each of a data processing job development environment and a data processing job production environment where each of the platform-agnostic processing job and the data source-agnostic data query are received from the version control repository.

In yet still another embodiment of the invention, the creating the restricted platform-specific data processing job includes creating the restricted platform-specific data processing job further using a view definition that defines, for the data lake, a data lake view that corresponds to a data warehouse view of the data warehouse.

In yet another additional embodiment of the invention, the at least one data processing task includes at least one of an extraction task, a transform task, a formatting task, an encryption task, a tokenization task, or a scheduling task.

In still another additional embodiment of the invention, the system further includes a data store storing an alias mapping, wherein the alias mapping includes a first mapping between a first data source alias and a first data source identifier of the first data source and a second mapping between a second alias and a second data source identifier of a second data source.

Still another embodiment of the invention includes a non-transitory computer-readable medium storing instructions that, when executed, cause receiving a platform-agnostic data processing job including at least one platform-agnostic data processing task, receiving a data source-agnostic data query including a data source alias, creating, for a target data source, a data source-specific data query at least by replacing, using an alias mapping and based on the target data source, the data source alias with a data source identifier that indicates the target data source, wherein the alias mapping includes a first mapping between a first data source alias and a first data source identifier of a first data source including a data warehouse of structured data, and a second mapping between a second alias and a second data source identifier of a second data source including a data lake of unstructured data, obtaining, for a target data processing platform and based on the at least one platform-agnostic data processing task, at least one platform-specific data processing task at least by retrieving, from a code library, platform-specific code configured to perform at least one data processing task at the target data processing platform, wherein the code library includes first code configured to perform the at least one data processing task at a first data processing platform of a first type and second code configured to perform the at least one data processing task at a second data processing platform of a second type that is different from the first type, creating, for the target data processing platform and using the data source-specific data query and the at least one platform-specific data processing task, a restricted platform-specific data processing job that is restricted to execution within an interactive development environment (IDE) connected to the target data processing platform, obtaining an unrestricted platform-specific data processing job configured for execution outside of the IDE at least by removing, from the restricted platform-specific data processing job, one or more configurations that restrict execution of the restricted platform-specific data processing job to execution within the IDE, and causing execution, outside of the IDE, of the unrestricted platform-specific data processing job at the target data processing platform, wherein the target data processing platform accesses, during execution of the unrestricted platform-specific data processing job and based on the data source-specific data query, the target data source.

In yet another embodiment of the invention, the instructions, when executed, further cause execution, within the IDE, of the restricted platform-specific data processing job.

In still another embodiment of the invention, the instructions, when executed, remove the one or more configurations of the restricted platform-specific data processing job at least by modifying at least one of the one or more configurations of the restricted platform-specific data processing job.

In yet still another embodiment of the invention, the instructions, when executed, further cause storing, in a version control repository, at least one of the platform-agnostic data processing job or the data source-agnostic data query, wherein the version control repository is accessible to each of a data processing job development environment and a data processing job production environment, where each of the platform-agnostic processing job and the data source-agnostic data query are received from the version control repository.

In yet another additional embodiment of the invention, the instructions, when executed, create the restricted platform-specific data processing job further using a view definition that defines, for the data lake, a data lake view that corresponds to a data warehouse view of the data warehouse.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
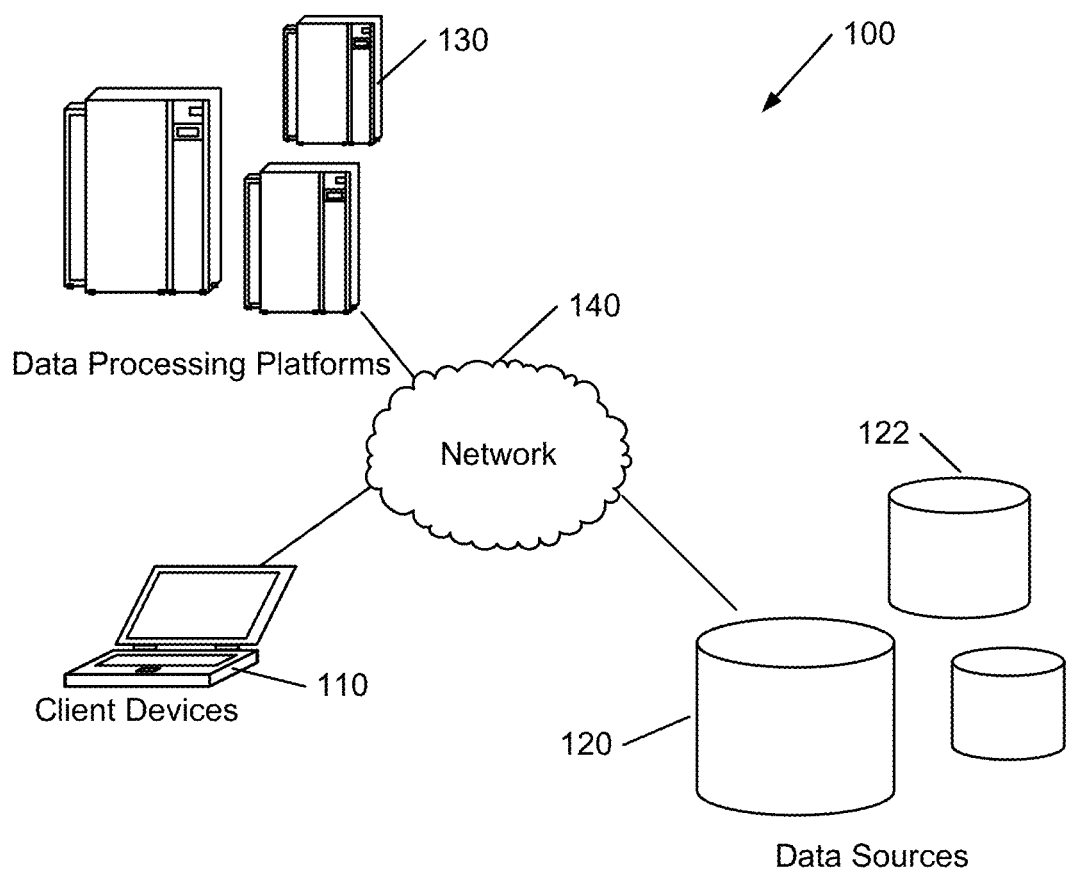
FIG. 1 shows an example of an operating environment in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure.

Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for data processing that is both source agnostic and platform agnostic. An enterprise may store a variety of data across a variety of data sources. A data source may store and organize the data in a manner specific to that data source. For example, one data source may store data as structured data while another data source stores data as unstructured data. Data analysts may prepare source-specific data queries to retrieve data of interest from a particular data source. Those source-specific data queries may be used to create data processing jobs that process the data of interest. A variety of data processing platforms may be employed to run the data processing jobs on the data of interest. A data processing platform may exhibit an architecture specific to that platform. As such, the data processing jobs run on a given data processing platform may be configured specifically for that platform.

Platform-agnostic and data-source agnostic data processing systems as described herein allow for data queries and data processing jobs to be created in an agnostic fashion and subsequently configured for a specific data source and data processing platform. A source-agnostic data query may be created that includes an alias for a target data source. The source-agnostic data query may then be transformed into a source-specific data query by replacing the data source alias with a data source identifier for a particular target data source of interest. In a similar fashion, a platform-agnostic data processing job may include one or more platform-agnostic data processing tasks. The platform-agnostic data processing job likewise may be transformed into a platform-specific data processing job by retrieving platform-specific code configured to execute the data processing tasks on a particular target data processing platform of interest.

Employing source-agnostic data queries and platform-agnostic data processing tasks may result in certain efficiencies for data analysts, data engineers, and data scientists. Source-agnostic data queries and platform-agnostic data processing jobs may provide, for example, commonalities that allow for rapid prototyping of data queries and data processing jobs and, in turn, faster development of source-specific data queries and platform-specific data processing jobs. Such commonalities may also render prototyped data queries and data processing jobs portable between data sources, data processing platforms, and operating environments. In this way, prototyped data queries and data processing jobs may be reused for current (and future) data sources and data processing platforms thereby avoiding duplicated efforts resulting from separately creating specific data queries and data processing jobs for each data source and data processing platform of interest. Further, source-agnostic data queries allow for heterogeneous data processing jobs that join data from a variety of disparate data sources.

Platform-agnostic and data-source agnostic data processing systems as described herein also allow for data processing jobs to be executed at a data processing platform directly or indirectly via an interactive development environment (IDE). In some instances, data analysts, engineers, or scientists may prefer to utilize an IDE to access, retrieve, and process data. In other instances, such individuals may prefer to run a data processing job directly at the data processing platform itself outside of the IDE. A platform-specific data processing job that is restricted to execution via an IDE may be transformed into an unrestricted platform-specific data processing job by removing any constraints that limit execution to be via the IDE and/or any aspects of the data processing job that are specific to the IDE. In this way, data analysts, engineers, and scientists are afforded the flexibility of leveraging the advantages an IDE provides if desired or at the data processing platform itself if preferred.

Operating Environments and Computing Devices

FIG. 1 shows an operating environment 100. The operating environment 100 may include at least one client device 110, at least one data processing platform 130, and/or at least one data source 120 and 122 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

Client devices 110 may provide data and/or interact with the data processing platforms 130 and/or data sources 120 and 122 as described herein. Data sources 120 and 122 may store data in a structured or unstructured form as described herein. Data processing platforms 130 may exchange data with client devices 110, access data stored in the data sources 120 and 122, and execute data processing jobs as described herein. However, it should be noted that any computing device in the operating environment 100 may perform any of the processes and/or store any data as described herein. The data processing platforms 130 and/or data sources 120 and 122 may be publicly accessible and/or have restricted access. Access to a particular server system may be limited to particular client devices 110. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in the operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
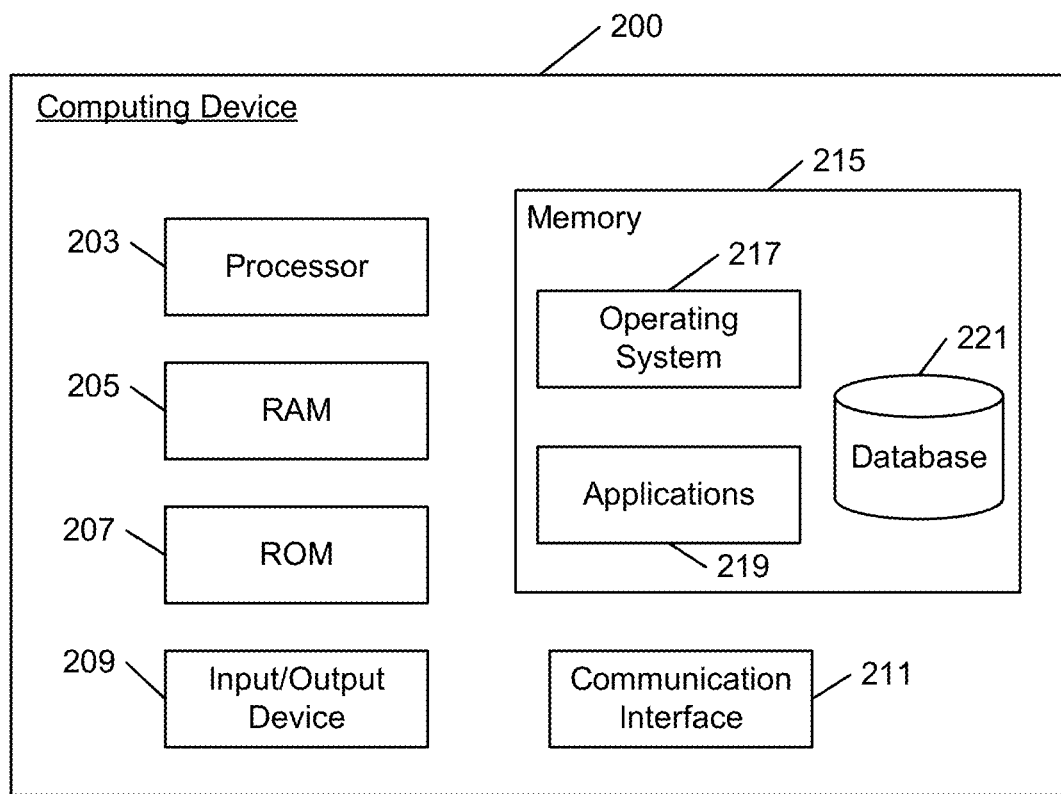
FIG. 2 shows an example computing device in accordance with one or more aspects described herein.

Turning now to FIG. 2, a conceptual illustration of a computing device 200 that may be used to perform any of the techniques as described herein is shown. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
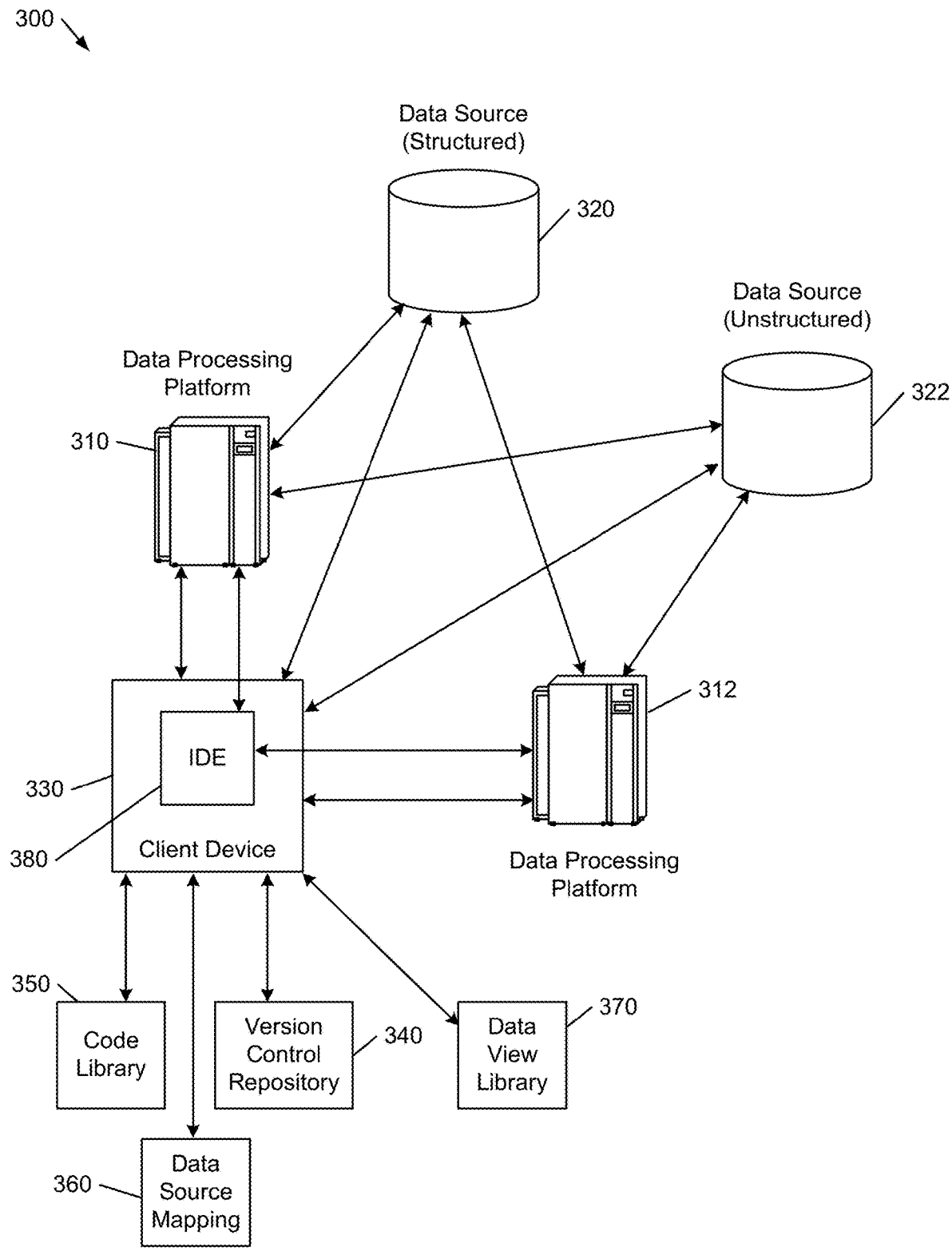
FIG. 3 shows an example of a platform-agnostic and data-source agnostic data processing system in accordance with one or more aspects described herein.

Data Queries for Data Sources and Data Processing Jobs for Data Processing Platforms FIG. 3 shows a platform-agnostic and data-source agnostic data processing system 300. The platform-agnostic and data-source agnostic data processing system 300 shown in FIG. 3 may be the same as or similar to the operating environment 100 shown in FIG. 1. The platform-agnostic and data-source agnostic data processing system 300, in this example, includes one or more data processing platforms 310 and 312, one or more data sources 320 and 322, a client device 330, a version control repository 340, a code library 350, a data source mapping 360, and a data view library 370. The client device 330 shown in FIG. 3 may be the same as or similar to the client device 110 shown in FIG. 1. The client device 330 may also include an IDE 380. The data processing platforms 310 and 312 shown in FIG. 3 may be the same as or similar to the data processing platforms 130 shown in FIG. 1. The data sources 320 and 322 may be the same as or similar to the data sources 120 and 122 shown in FIG. 1. The elements shown in FIG. 3 may be in signal communication with each other via one or more networks, e.g., network 140 of FIG. 1 or a similar network. One or more elements shown in FIG. 3 may be located locally or remotely relative to one or more other elements shown in FIG. 3. The relative location of an element shown in FIG. 3 to another element may be logical (e.g., residing on the same or different domains) and/or physical (e.g., resided at the same or different geographic locations).

The data processing platforms 310 and 312 may reside on premise and/or remotely (e.g., in the "cloud"). The data processing platforms 310 and 312 may be proprietary or open source data processing platforms. Examples of data processing platforms include AMAZON EMR, APACHE SPARK, DATABRICKS, and JUPYTER. The data processing platforms 310 and 312 may be configured to perform a variety of data processing tasks. Example of data processing tasks include: extract, transform, and load operations; detokenization; encryption/decryption; cleaning; filtering; deduplication; anonymization; optimization; normalization; augmentation; classification; grouping; clustering; integration; summarization; abstraction; conversion; transformation; name binding; packaging; compression; decompression; encoding; decoding; modeling; training; machine learning; training (e.g., of classifiers, of neural networks, etc.); data mining; statistical analysis; regression analysis; predicting; forecasting; scheduling; pattern recognition; anomaly detection; diagnosing; computation; graphing; visualization; prepending (e.g., headers); appending (e.g., footers); sending; transmitting; receiving; and the like. The data processing platforms 310 and 312 may access one or more data sources (e.g., data sources 320 and 322) during execution of a data processing job. Such access may include retrieving data from the data sources and sending data to the data sources for storage. The data processing platforms 310 and 312 may also generate new data during executing of a data processing job which may be sent to one or more data sources (e.g., data sources 320 and 322) for storage.

The data sources 320 and 322 may also reside on premises and/or remotely (e.g., in the "cloud"). The data sources 320 and 322 may reside on proprietary data storage platforms or third-party data storage platforms. Examples of data storage platforms include SNOWFLAKE, CLOUDERA, AMAZON REDSHIFT, ORACLE, SQL SERVER, POSTGRESQL, MARIADB, MYSQL, DYNAMODB, and the like. The data sources 320 and 322 may store structured and/or unstructured data. In the example shown in FIG. 3, data source 320 may store structured data while data source 322 may store unstructured data. Structured data may include, for example, data that is organized and formatted according to a defined data model. Unstructured data may include, for example, data in its native format that does not conform to a predefine data model. Examples of structured data include, for example, dates, addresses, credit card numbers, telephone numbers, zip codes, point-of-sale records, and the like. Examples of unstructured data include, for example, raw sensor data (e.g., acoustic, sound, vibration, chemical, biological, electric, electrical, electromagnetic, radiation, magnetic, moisture, fluid flow, speed, acceleration, inertia, distance, navigational, position, angle, displacement, presence, proximity, optical, pressure, force, density, thermal, and the like), media data (e.g., image data, audio data, video data, audiovisual data, etc.), machine-generated data (e.g., by imaging devices and imaging systems, by scientific instruments, etc.) document collections (e.g., business records), social media data (e.g., social media posts), free-form data (e.g., open-ended feedback or survey responses), and the like. The data sources may also store other types of data such as, for example, semi-structured data (e.g., data having a self-described structure by way of tags or other markers) and metadata. Example of semi-structured data include, for example, XML data, JSON data, and YAML data. The data sources 320 and 322 may store different types of data such as, for example, quantitative data and qualitative data. The data sources 320 and 322 may store different file types such as, for example, text files, document files, audio files, video files, and other binary files. The data stored at the data sources 320 and 322 may be processed (e.g., cleaned, filtered, etc.) or unprocessed (e.g., raw, as-is). Accordingly, the data sources 320 and 322 may include one or more of a database (e.g., a relational database), a data warehouse, a data mart, and/or a data lake. Structured data generally, although not exclusively, may be stored (e.g., at data source 320) in a database, data warehouse, or data mart. Unstructured data generally, although not exclusively, may be stored in a data lake (e.g., at data source 322). Structured data may also be stored in a data lake, and unstructured data may also be stored in a database, data warehouse, or data mart.

The client device 330 may access the data processing platforms with or without use of the IDE 380. A user may use the IDE 380 to run data processing jobs on the data processing platforms 310 and 312. The IDE 380 may facilitate the creation of data processing jobs. In this regard, the data processing jobs created using the IDE 380 may be configured for execution by that particular IDE 380. In some instances, a data processing job may be configured and/or formatted such that it is restricted to being executed from within that IDE 380. For example, a data processing job may include one or more formatting elements, input elements, or output elements that requires executing the data processing job via the IDE 380. For convenience, a data processing job that is restricted in this fashion may be and is referred to herein as a restricted data processing job. Also for convenience, a data processing job that is not restricted to execution from within a particular IDE (e.g., executable from within another IDE or at directly a data processing platform) may be and is referred to herein as an unrestricted data processing job.

As seen in FIG. 3, the client device 330 may also be in signal communication with the data sources 320 and 322 to access the data stored therein, e.g., to retrieve and/or store data. The client device 330 may access the data sources 320 and 322 via the IDE 380 which may facilitate the user's access to data of interest that is stored in the data sources 320 and 322. For example, a user also may use the IDE to generate data queries, data visualizations, data summaries, data reports, and the like.

The client device 330 may also be in signal communication with the data source mapping 360. The client device 330 may utilize the data source mapping 360 to transform a source-agnostic data query into a source-specific data query configured for a particular target data source (e.g., data source 320 with structured data or data source 322 with unstructured data). A source-agnostic data query may include an alias for the target location of the data. For example, a source-agnostic data query may include an alias instead of a particular table name of a database schema, e.g., SELECT SCORE FROM {SCORE_SOURCE} WHERE SCORE<x, whereby "{SCORE_SOURCE}" is the alias for the target location of the "SCORE" data. The data source mapping 360 may include multiple aliases. Each alias may be mapped multiple target locations at different data sources (e.g., data sources 320 and 322). The data source mapping 360 may include, for example, one or more mappings between the alias (e.g., "{SCORE_SOURCE}") and the respective target locations of the data (e.g., "SCORE") in one or more data sources (e.g., "db.schema.score_table" for a first data source and "scores" for a second data source). Accordingly, a data source mapping using the above example may be configured as:

```
mappings = {
    "SCORE_SOURCE": {
        "data source #1": "db.schema.score_table"
        "data source #2": "scores" } }
```

The source-agnostic data query may be transformed into a source-specific data query by, e.g., replacing the alias with the target location of the data. Examples of target data sources include a data source itself (e.g., a database), a location within a data source (e.g., a table of a database), or a defined view of a data source (e.g., the result of a data query of a data source). The target data source may be specified and the target location of the data for the specified target data source may be retrieved from the data source mapping 360 and substituted for the alias in the source-agnostic data query. The result of that substitution is a source-specific data query that may be utilized to retrieve the data of interest from the target location of the data in the specified target data source. Continuing the example from above, the example source-agnostic data query may be transformed into the following source-specific data query by specifying "data source #1" as the target data source of interest: SELECT SCORE FROM db.schema.score_table WHERE SCORE<x. An identifier for the target data source of interest, the source-agnostic data query, and the data source mapping may be specified, for example, by providing them to a function, service, or the like that accepts them as input. Accordingly, the client device 330 may be configured (e.g., programmed) to provide such a function, service, or the like. Alternatively, the client device 330 may be configured to perform a lookup in the data source mapping 360 using an identifier for the target data source of interest and to translate the alias into the target location of the data using the result received from the data source mapping 360. Following the transformation of the source-agnostic data source, the source-specific data query thus includes the target location for the data at the target data source rather than the alias.

The client device 330 may also be in signal communication with the code library 350. The client device 330 may utilize the code library 350 to transform a platform-agnostic data processing task into a platform-specific data processing task configured for a particular data processing platform (e.g., data processing platform 310 or data processing platform 312). A platform-agnostic data processing task may include a task identifier that maps to an identifier for platform-specific code in the code library 350. The code library 350 may include platform-specific code (e.g., functions, modules, scripts, instructions, and the like) configured for one or more data processing platforms (e.g., data processing platform 310 or data processing platform 312). The platform-specific code may be such that it is executable on only one data processing platform (or only one type of data processing platform). The platform-specific code may also be such that it is executable on two different types of data processing platforms but not a third data processing platform. The platform-specific code for a data processing task to be executed at a particular data processing platform of interest may be retrieved from the code library 350 by specifying, e.g., the identifier for the data processing task and an identifier for the target data processing platform of interest. These identifiers may be specified, for example, by providing them to a function, service, or the like that accepts them as input. Accordingly, the client device 330 likewise may be configured to provide such a function, service, or the like. The code library 350, therefore, yields portable code that can be reused by multiple users to improve the efficiency of creating data processing jobs with corresponding data processing tasks.

The client device 330 may also be in signal communication with the data view library 370. The data view library 370 may include view definitions for one or more data sources (e.g., data source 320 or data source 322). A view definition stored in the data view library for one data source (e.g., data source 322) may emulate a view of another data source (e.g., data source 320). The data source mapping 360, therefore, may map a data source alias to a view definition stored in the data view library 370. In other words, the data source alias of a source-agnostic data query may be replaced with a view definition from the data view library 370 when transforming the source-agnostic data query into a source-specific data query. While the code library 350 and the data view library 370 are shown as separate elements in FIG. 3, alternatively, the code library 350 may store the view definitions.

A platform-agnostic data processing job may include one or more platform-agnostic data processing tasks. The platform-agnostic data processing job may be transformed into a platform-specific data processing job by transforming each of its platform-agnostic data processing tasks into platform-specific data processing tasks. A platform-specific data processing job may include platform-specific data processing tasks configured for execution only on one data processing platform (or only one type of data processing platform). A platform-specific data processing job may also include platform-specific data processing tasks configured for execution on different data processing platforms (or different types of data processing platforms). For example, a platform-specific data processing job may include a first platform-specific data extraction task configured for execution on one data processing platform (e.g., data processing platform 310) that extracts unstructured data from one data source (e.g., data source 322), a second platform-specific data transformation task likewise configured for execution on that data processing platform that classifies the extracted data, a third platform-specific data load task likewise configured for execution on that data processing platform that loads the transformed data into a different data source (e.g., data source 320), and a fourth platform-specific data anonymization task configured for execution on a different data processing platform (e.g., data processing platform 312) that anonymizes the transformed data loaded into the other data source.

In some cases where platform-specific data processing tasks and platform-specific data processing jobs already exist, they may be rewritten as platform-agnostic data processing tasks and platform-agnostic data processing jobs, respectively, in order to achieve a consistent workflow including, for example, parameter setup, error handling, and external system calls (e.g., invoking API functions). Those rewritten platform-agnostic data processing jobs and platform-agnostic data processing tasks may thus be available as artifacts to use in a modular fashion by the data scientists, data engineers, etc.

Platform-agnostic data processing tasks and platform-agnostic data processing jobs may be transformed, respectively, into platform-specific data processing tasks and platform-specific data processing jobs prior to execution at a data processing platform. Data processing tasks and data processing jobs, both platform-agnostic and platform-specific, may be stored in the version control repository 340. In this way, the version control repository 340 may be a centralized location at which the client device 330 and other client devices may store versions of data processing jobs and data processing tasks for efficient use by multiple users and reuse in the future. The data processing jobs and data processing tasks thus form a pool of portable and transportable resources that include the institutional knowledge and logic provided by the data analysts, data engineers, and data scientists that can be synergistically shared among such teams which, in turn, allows each role to leverage the knowledge and skill of the others when creating artifacts to access and process data of interest.

Platform-agnostic data processing tasks and platform-agnostic data processing jobs may be transformed, respectively, into platform-specific data processing tasks and platform-specific data processing jobs "on-the-fly" in an ad hoc fashion during execution. For example, execution of a data processing job may include executing in sequence each data processing task and, at each step in the execution sequence, retrieving the platform-specific code for the current data processing task from the code library, and executing the retrieved code at that stage of the sequence.

The platform-specific data processing job may be a restricted platform-specific data processing job or an unrestricted data processing job. As described above, a restricted platform-specific data processing job may be restricted to execution at a data processing platform via an IDE (e.g., IDE 380). An unrestricted platform-specific data processing job may not be restricted to execution via an IDE and instead may be executed directly at a data processing platform itself. A restricted platform-specific data processing job may include one or more configurations that restrict its execution via an IDE. Such configurations may include, for example, one or more formatting elements (e.g., file formatting elements), one or more input elements associated with one or more input functions of an IDE, and one or more output elements associated with an output function of an IDE. The restricted platform-specific data processing job may be transformed into an unrestricted platform-specific data processing job by removing one, some, or all of such configurations. Removing such configurations may include, for example, deleting one or more configurations from the restricted platform-specific data processing job, modifying one or more existing configurations of the restricted platform-specific data processing job resulting in new configurations that reconfigure the data processing job, and adding one or more new configurations to the data processing job that, e.g., override one or more existing configurations. For example, in some cases, such configurations may be implemented using ASCII code (e.g., pre-compile code) that can be rewritten to remove the restriction that limits execution to execution via an IDE. Pre-compile code may also be rewritten for improved performance, e.g., to achieve on-the-fly compiling or batch compiling for release of the artifact during deployment.

Figure 4:
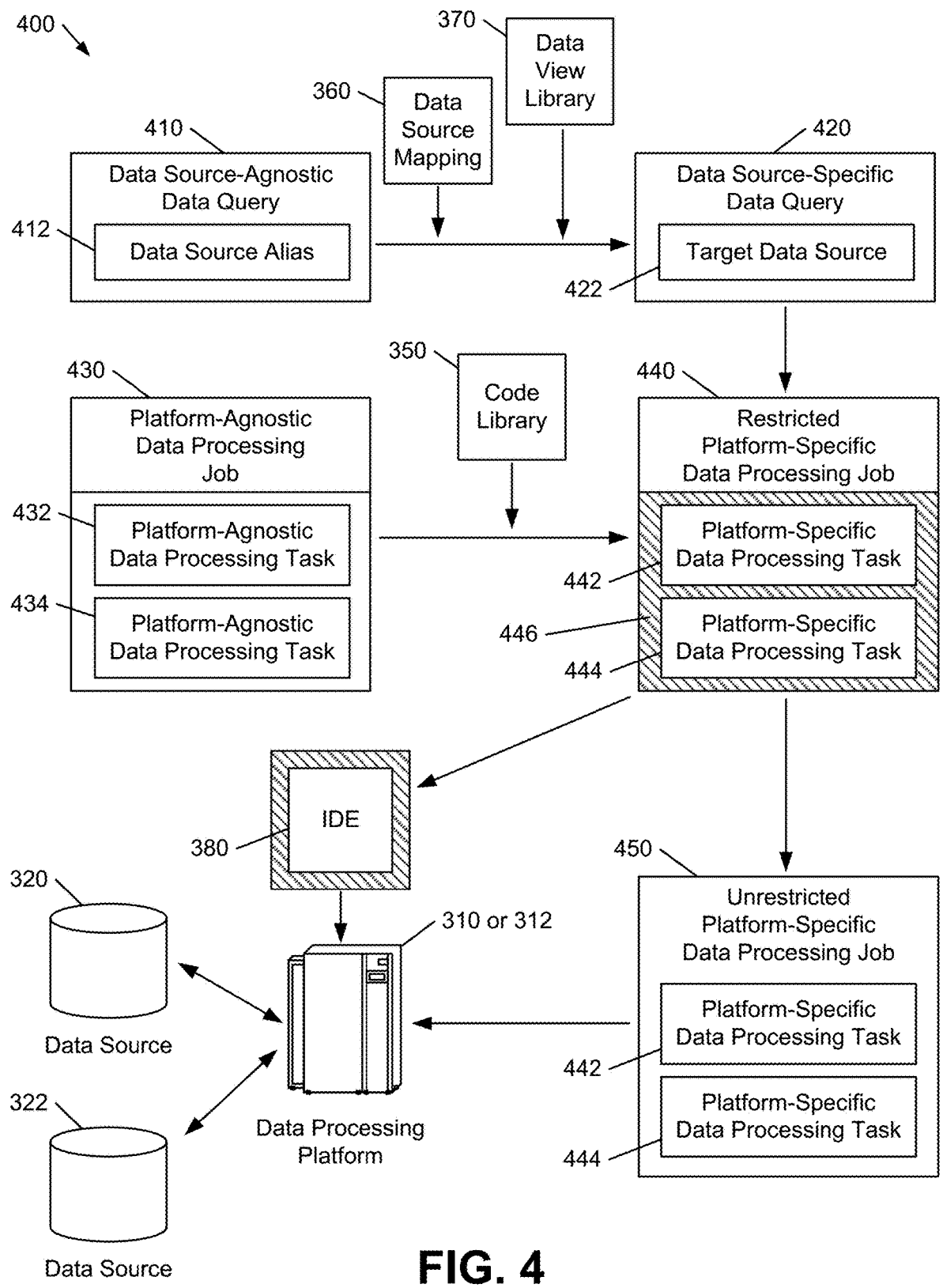
FIG. 4 shows an example of a transformation of platform-agnostic data processing job and a transformation of a data source-agnostic data query in accordance with one or more aspects described herein.

Transforming Source-Agnostic Data Queries and Platform-Agnostic Data Processing Jobs FIG. 4 shows an example of a workflow 400 that transforms a data source-agnostic data query 410 into a data source-specific data query 420 and that transforms a platform-agnostic data processing job 420 into a restricted platform-specific data processing job 440 and an unrestricted platform-specific data processing job 450. The data source-specific data query 420 may be used to create the restricted platform-specific data processing jobs 440 and 450. For example, one or more data processing tasks of a data processing job (e.g., a data extraction task) may be configured to run the data-source specific data query 420 during execution of the data processing job. Although only one data source-specific data query 420 is shown in FIG. 4, multiple data source-agnostic data queries may be transformed to obtain multiple data-source specific data queries which are used to create a platform-specific data processing job. For example, individual data processing tasks of a data processing job may each be configured to run a respective data source-specific data query during execution of the data processing job. A data query may include database procedure code (e.g., one or more stored procedures) that can be executed inline with the data query. A data source-agnostic data query, therefore, may include data-source agnostic database procedure code (e.g., one or more data source-agnostic stored procedures). The data source-agnostic database procedure code may be transformed into data source-specific database procedure code (e.g., one or more data source-specific stored procedures) when transforming a data source-agnostic data query into a data-source specific data query.

As seen in FIG. 4 and described above, the data source-agnostic data query 410 includes a data source alias 412. The data source-agnostic data query 410 may be transformed into the data-source specific data query 420 by using at least one of the data source mapping 360 or the data view library 370 to replace the data source alias with a target data source 422.

As also seen in FIG. 4 and described above, the platform-agnostic data processing job 430 shown in this example includes multiple platform-agnostic data processing tasks 432 and 434. The platform-agnostic data processing job 430 may be transformed into the restricted platform-specific data processing job 440 by using the code library 350 to obtain the platform-specific code that implements the functionality of the platform-agnostic data processing tasks 432 and 434 at a target data processing platform (e.g., data processing platform 310 or 312). This transformation thus results in the restricted platform-specific data processing job 440 which, in this example, includes multiple platform-specific data processing tasks 442 and 444. As described above, the data processing tasks 442 and 444 may each be configured for execution on the same data processing platform or the same type of data processing platform. Alternatively, the data processing tasks 442 and 444 may be individually configured for execution on different data processing platforms or different types of data processing platforms. The restricted platform-specific data processing job 440, in this example, also includes one or more configurations 446 (e.g., formatting elements, input elements, or output elements) that restrict its execution to execution via the IDE 308. The restricted platform-specific data processing job 440 in turn may be transformed into the unrestricted platform-specific data processing job 450 by removing the configurations 446 that restrict execution to execution via the IDE 308.

Figure 5:
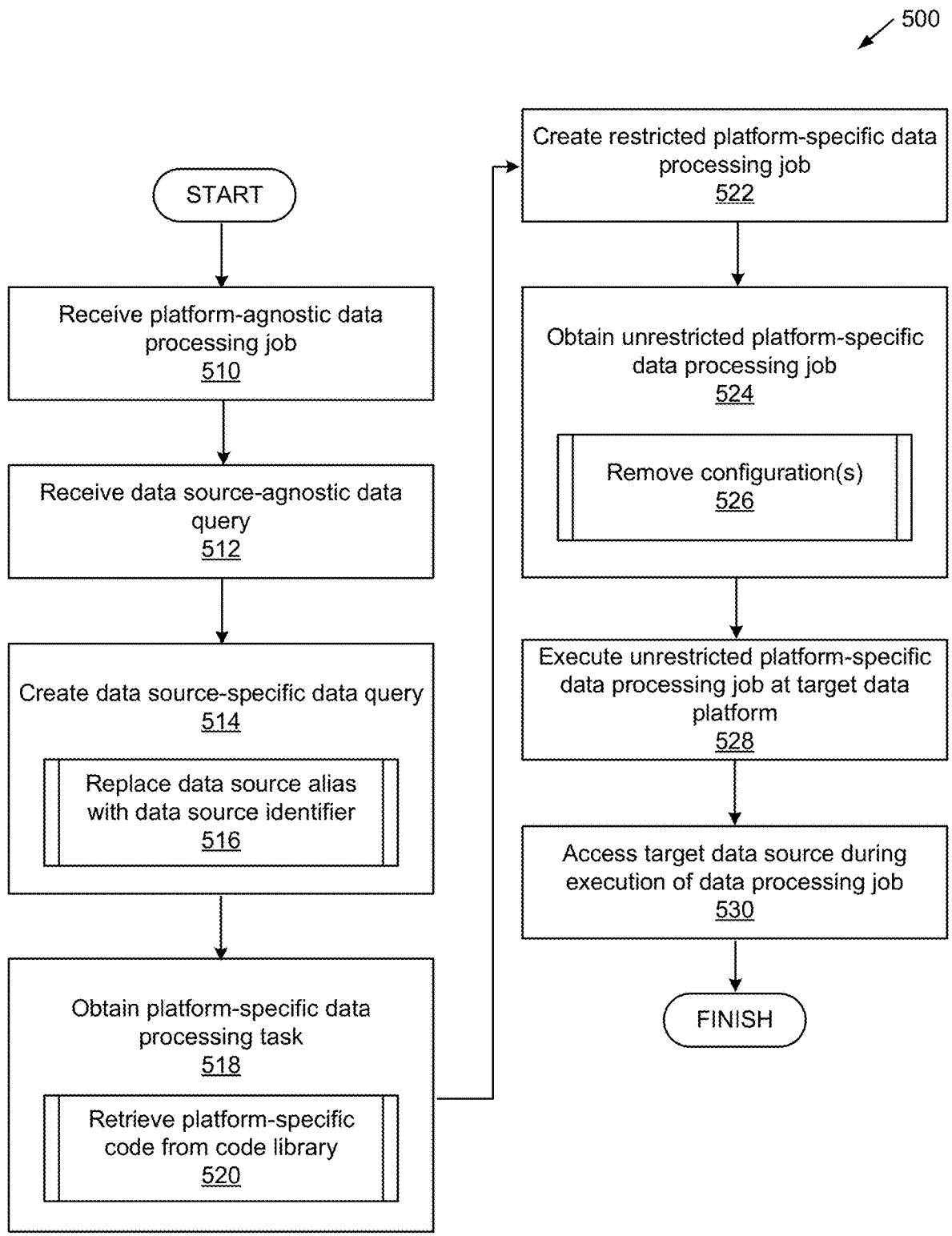
FIG. 5 shows a flow chart of example steps of a process for obtaining an unrestricted platform-specific data processing job in accordance with one or more aspects described herein.

FIG. 5 shows a flowchart 500 of example steps for obtaining an unrestricted platform-specific data processing job. The process may begin with receiving a platform-agnostic data processing job (510) and a data source-agnostic data query (512). A data source-specific data processing query may be created from the data source-agnostic data query (514). For example, as described above, creating the data source-specific data query may include replacing a data source alias in the data source-agnostic data query with a data source identifier (516) for a target data source. For each platform-agnostic data processing task of the platform-agnostic data processing job, a platform-specific data processing task may be obtained (518). As described above, obtaining a platform-specific data processing task may include retrieving, from a code library, platform-specific code (520) that implements the functionality of the data processing task for a particular data processing platform or type of data processing platform. Having obtained the platform-specific data processing task(s), a platform-specific data processing job may be created (522). As described above, the platform-specific data processing job may include one or more platform-specific data processing tasks that correspond to the platform-agnostic data processing tasks of the platform agnostic data processing job. Having created the restricted platform-specific data processing job, an unrestricted platform-specific data processing job may be obtained (524) which may include removing one or more configurations from the restricted platform-specific data processing job. Having removed the restrictions, the unrestricted data processing job may be executed directly at a target data processing platform of interest (528) without the need for an IDE to facilitate its execution. During execution, the target data processing platform may access the target data source specified in a data-source specific data query used by a platform-specific data processing task of the data processing job (530).

Figure 6:
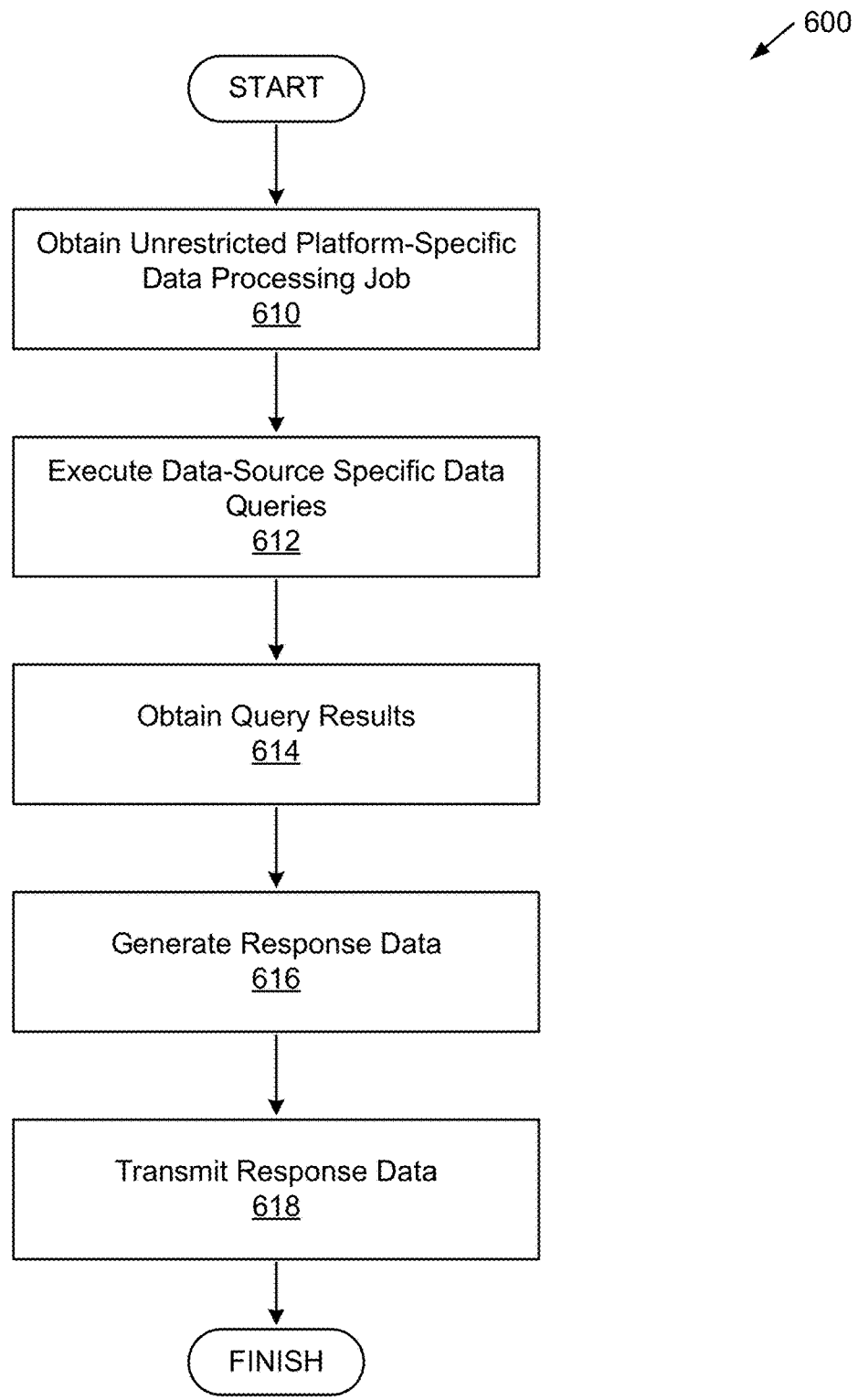
FIG. 6 shows a flow chart of example steps of a process for generating response data in accordance with one or more aspects described herein.

FIG. 6 shows a flowchart 600 of example method steps for generating response data using a platform-specific data processing job. The flowchart shown in FIG. 6 is described by way of example in conjunction with FIG. 7 which shows a workflow 700 that illustrates an example use case for using unrestricted platform-specific data processing jobs to obtain response data. In this example, the workflow 700 shown in FIG. 7 the generated response data includes sales forecasts 710 obtained from sales data 720 and 730 respectively acquired by one or more point of sale devices 722 and 732. The operating environment shown in FIG. 7 may be the same as or similar to the operating environment 100 of FIG. 1. The workflow 700 shown in FIG. 7 may also be performed in the context of the platform-agnostic and data-source agnostic data processing system 300 of FIG. 3. The flowchart 600 for generating response data using a platform-specific data processing job may generate response data in other contexts and for other use cases.

Figure 7:
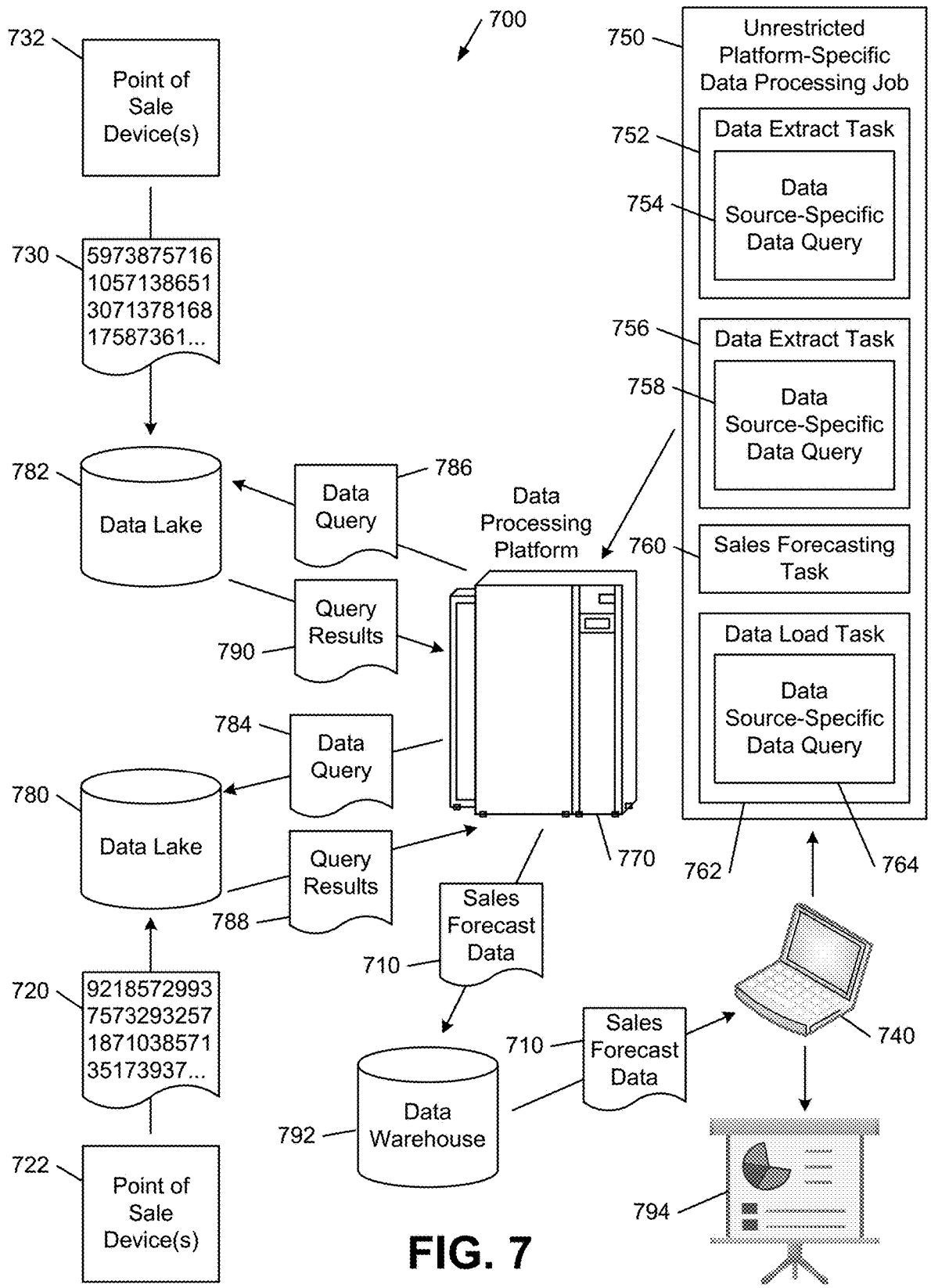
FIG. 7 shows a workflow of an example use case that generates response data in accordance with one or more aspects described herein.

The process may begin with obtaining an unrestricted platform-specific data processing job (610). The unrestricted platform-specific data processing job may be obtained as described above, e.g., with reference to FIG. 4 and FIG. 5. With reference to FIG. 7, for example, a client device 740 may generate an unrestricted data processing job 750. The example unrestricted platform-specific data processing job 750, in this example, is configured to extract sales data from multiple data sources and generate sales forecasts based on the extracted sales data. As such, the example unrestricted platform-specific data processing job 750 includes a first data extract task 752 having a first data source-specific data query 754 configured to extract sales data from a first data source, a second data extract task 756 having a second data source-specific data query 758 configured to extract sales data from a second data source, a sales forecasting task 760 to generate sales forecast data based on the extracted sales data, and a data load task 762 having a data source-specific data query configured to load the sales forecast data into a third data source. The client device 740 may provide the unrestricted platform-specific data processing job 750 to a data processing platform 770 for execution.

Having obtained an unrestricted platform-specific data processing job, the data source-specific data queries may be executed (612). A data processing platform can provide the data-source specific data queries to the appropriate data sources for execution. The data source-specific data queries may be provided to the appropriate data sources serially and/or in parallel. The data source-specific data queries may be provided to the appropriate data sources directly or using external computing devices that provide external services that can be accessed using one or more application programming interfaces (APIs). These APIs can be invoked using an external reference, such as an internet protocol (IP) address, a uniform resource locator (URL), or the like. In some examples, executing a data source-specific data query may include one or more pre-query processing steps (not shown). Such pre-query processing steps may include updates to the data, external system calls (e.g., invoking API functions), obtaining security credentials (e.g., for data sources and target data destinations), and the like. Such pre-processing steps may be optional and/or performed only when needed (e.g., when a security mechanism is used to control access to a data source). As seen in FIG. 7, the data processing platform 770 in this example may receive the unrestricted platform-specific data processing job 750 and execute the data source-specific data queries 754 and 758 of its data extract tasks 752 and 756. As noted above, the data source-specific data queries 754 and 758 in this example are configured to extract data from different data sources. In the example shown in FIG. 7, the point of sale devices 722 and 730 provide their respective sales data 720 and 732 to different data sources 780 and 782. The data sources 780 and 782 in this example are data lakes. The data processing platform 770 therefore, may execute a first data query 784 at the first data source 780 and may execute a second data query 786 at the second data source 782.

Query results may be obtained from the executed data queries (614). A data source may generate query results from the data-source specific data queries received from a data processing platform and return the generated query results to the data processing platform. The query results may be returned to the data processing platform in a synchronous or asynchronous fashion. In some example embodiments, a data processing platform provides its own API configured to receive query results from a data source in response to a data-source specific data query submitted to the data source. A data-source specific data query may include, for example, callback reference to the API of the data processing platform. The callback reference can be invoked using an external reference, such as an internet protocol (IP) address, a uniform resource locator (URL), or the like. The data source may invoke the callback reference to provide the generated query results to the data processing platform. The data processing platform may receive respective query results from multiple data sources serially and/or in parallel. The query results may include requested data returned by the data source of interest in response to the data query (e.g., all or some subset of the data stored at the data source). The query results may additionally or alternatively include the results of one or data manipulations of the data stored at the data source of interest using, for example, a data-source specific data manipulation language (DML) configured for the data source indicated in the data-source specific data query. The query results may additionally or alternatively include the results of one or more operations on the objects of the data source of interest (e.g., tables, indices, etc.) using, for example, a data description language (DDL) configured for the data source indicated in the data-source specific data query. In this regard, the query results may additionally or alternatively include an indication of successful or failed query execution, affected tables, row counts of affected tables, and the like. With reference to FIG. 7, the data processing platform in this example may obtain first query results 788 from the first data source 780 and second query results 790 from the second data source 782. The query results 788 and 790 may respectively include some or all of the sales data 720 and 730 respectively provided by the point of sale devices 722 and 732.

Having obtained the query results, response data may be generated (616). The response data may be generated by the data processing platform based on the query results received from the data sources in response to the data queries. Generating the response data which may include, for example and without limitation, filtering, cleaning, de-duplicating, validating (e.g., for data quality, schema compliance), sorting, rearranging, aggregating, joining, merging, combining, concatenating, splitting, formatting, reformatting, summarizing, visualizing, data typing, and other manipulations described herein in order to transform the query results into the response data based on the data processing task(s) of the data processing job executed by the data processing platform. As noted above, the response data shown by way of example in FIG. 7 includes sales forecast data 710. As such, the data processing platform 770 may generate the sales forecast data 710 based on the obtained query results 788 and 790 during execution of the sales forecasting task 760 of the unrestricted platform-specific data processing job 750.

The generated response data may then be transmitted (618). Transmitting the response data may include transmitting it for storage in one or more data stores. Transmitting the response data may include transmitting it to a client device for further processing, e.g., display, visualization, and the like. As seen in FIG. 7, the data processing platform 770 in this example transmits the generated sales forecast data 710 to a data store 792 for storage. The data store 792 in this example is a data warehouse. As such, the data processing platform 770 may transmit the sales forecast data to the data store 792 during execution of the data load task 762 that includes a data source-specific data query 764 configured to store data into the data store 792. The data store 792 in this example is accessible to the client device which may retrieve the sales forecast data 710. The client device 740 in this example may then output a visualization 794 of the retrieved sales forecast data 710. Additional examples and use cases will be appreciated with the benefit of this disclosure.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention.

Thus, embodiments of the present invention should be considered in all respects as illustrative and not restrictive. Accordingly, the scope of the invention should be determined not by the embodiments illustrated, but by the appended claims and their equivalents.

The invention claimed is:

1. A computer-implemented method comprising:
    receiving a platform-agnostic data processing job;
    obtaining, for a target data processing platform and based on the platform-agnostic data processing job, at least one platform-specific data processing job;
    creating, for the target data processing platform and using the platform-specific data processing job, a restricted platform-specific data processing job that is restricted to execution within an interactive development environment (IDE);
    obtaining an unrestricted platform-specific data processing job configured for execution outside of the IDE at least by removing, from the restricted platform-specific data processing job, one or more configurations that restrict execution of the restricted platform-specific data processing job to execution within the IDE; and
    causing execution, outside of the IDE, of the unrestricted platform-specific data processing job at the target data processing platform.

2. The computer-implemented method of claim 1, wherein the obtaining the at least one platform-specific data processing job comprises retrieving, from a code library, platform-specific code configured to perform at least one data processing task at the target data processing platform, wherein the code library comprises first code configured to perform at least one data processing task at a first data processing platform of a first type and second code configured to perform the at least one data processing task at a second data processing platform of a second type that is different from the first type.

3. The computer-implemented method of claim 1, wherein the removing the one or more configurations from the restricted platform-specific data processing job comprises at least one of:
    modifying at least one of the one or more configurations of the restricted platform-specific data processing job; or
    removing, from the restricted platform-specific data processing job, at least one of:
        at least one formatting element associated with the IDE;
        at least one input element associated with an input function of the IDE; or
        at least one output element associated with an output function of the IDE.

4. The computer-implemented method of claim 1, further comprising storing, in a version control repository, the platform-agnostic data processing job, wherein the version control repository is accessible to each of a data processing job development environment and a data processing job production environment.

5. The computer-implemented method of claim 1, wherein the creating the platform-specific data processing job comprises creating the platform-specific data processing job further using a view definition that defines, for a target data source, a first data view that corresponds to a second data view of a second data source.

6. The computer-implemented method of claim 1, wherein the at least one platform-agnostic data processing job comprises at least one platform-agnostic data processing task comprising one or more of an extraction task, a transform task, a formatting task, an encryption task, a tokenization task, or a scheduling task.

7. The computer-implemented method of claim 1, further comprising:
    receiving a data source-agnostic data query comprising a data source alias; and
    creating, for a target data source, a data source-specific data query at least by replacing, using an alias mapping and based on the target data source, the data source alias with a data source identifier that indicates the target data source;
    wherein the creating the restricted platform-specific data processing job comprises creating the restricted platform-specific data processing job further based on the data source-specific data query;
    wherein the alias mapping comprises at least one of:
        a first mapping between a first data source alias and a first data source identified of a first data source comprising a data warehouse of structured data; or
        a second mapping between a second alias and a second data source identifier of a second data source comprising a data lake of unstructured data; and
    wherein the target data processing platform accesses, during execution of the unrestricted platform-specific data processing job and based on the data source-specific data query, the target data source.

8. A system comprising:
    one or more processors; and memory storing computer-readable instructions that, when executed by the one or more processors, cause the system to:
    receive a platform-agnostic data processing job;
    obtain, for a target data processing platform and based on the platform-agnostic data processing job, at least one platform-specific data processing job;
    create, for the target data processing platform and using the platform-specific data processing job, a restricted platform-specific data processing job that is restricted to execution within an interactive development environment (IDE);
    obtain an unrestricted platform-specific data processing job configured for execution outside of the IDE at least by removing, from the restricted platform-specific data processing job, one or more configurations that restrict execution of the restricted platform-specific data processing job to execution within the IDE; and
    cause execution, outside of the IDE, of the unrestricted platform-specific data processing job at the target data processing platform.

9. The system of claim 8, wherein the instructions, when executed by the one or more processors, cause the system to obtain the at least one platform-specific data processing job at least by retrieving, from a code library, platform-specific code configured to perform at least one data processing task at the target data processing platform, wherein the code library comprises first code configured to perform at least one data processing task at a first data processing platform of a first type and second code configured to perform the at least one data processing task at a second data processing platform of a second type that is different from the first type.

10. The system of claim 8, wherein the instructions, when executed by the one or more processors, cause the system to remove the one or more configurations from the restricted platform-specific data processing job at least by:
    modifying at least one of the one or more configurations of the restricted platform-specific data processing job; or
    removing, from the restricted platform-specific data processing job, at least one of:
        at least one formatting element associated with the IDE;
        at least one input element associated with an input function of the IDE; or
        at least one output element associated with an output function of the IDE.

11. The system of claim 8, wherein the instructions, when executed by the one or more processors, further cause the system to store, in a version control repository, the platform-agnostic data processing job, wherein the version control repository is accessible to each of a data processing job development environment and a data processing job production environment.

12. The system of claim 8, wherein the instructions, when executed by the one or more processors, cause the system to create the platform-specific data processing job at least by creating the platform-specific data processing job further using a view definition that defines, for a target data source, a first data view that corresponds to a second data view of a second data source.

13. The system of claim 8, wherein the at least one platform-agnostic data processing job comprises at least one platform-agnostic data processing task comprising one or more of an extraction task, a transform task, a formatting task, an encryption task, a tokenization task, or a scheduling task.

14. The system of claim 8, wherein the instructions, when executed by the one or more processors, further cause the system to:
    receive a data source-agnostic data query comprising a data source alias; and
    create, for a target data source, a data source-specific data query at least by replacing, using an alias mapping and based on the target data source, the data source alias with a data source identifier that indicates the target data source;
    wherein the creating the restricted platform-specific data processing job comprises creating the restricted platform-specific data processing job further based on the data source-specific data query; and
    wherein the alias mapping comprises at least one of:
        a first mapping between a first data source alias and a first data source identified of a first data source comprising a data warehouse of structured data; or
        a second mapping between a second alias and a second data source identifier of a second data source comprising a data lake of unstructured data; and
    wherein the target data processing platform accesses, during execution of the unrestricted platform-specific data processing job and based on the data source-specific data query, the target data source.

15. A non-transitory computer-readable medium storing instructions that, when executed, cause:
    receiving a platform-agnostic data processing job;
    obtaining, for a target data processing platform and based on the platform-agnostic data processing job, at least one platform-specific data processing job;
    creating, for the target data processing platform and using the platform-specific data processing job, a restricted platform-specific data processing job that is restricted to execution within an interactive development environment (IDE);
    obtaining an unrestricted platform-specific data processing job configured for execution outside of the IDE at least by removing, from the restricted platform-specific data processing job, one or more configurations that restrict execution of the restricted platform-specific data processing job to execution within the IDE; and
    causing execution, outside of the IDE, of the unrestricted platform-specific data processing job at the target data processing platform.

16. The non-transitory computer-readable medium if claim 15, wherein the obtaining the at least one platform-specific data processing job comprises retrieving, from a code library, platform-specific code configured to perform at least one data processing task at the target data processing platform, wherein the code library comprises first code configured to perform at least one data processing task at a first data processing platform of a first type and second code configured to perform the at least one data processing task at a second data processing platform of a second type that is different from the first type.

17. The non-transitory computer-readable medium if claim 15, wherein the removing the one or more configurations from the restricted platform-specific data processing job comprises at least one of:
    modifying at least one of the one or more configurations of the restricted platform-specific data processing job; or removing, from the restricted platform-specific data processing job, at least one of:
  at least one formatting element associated with the IDE;
  at least one input element associated with an input function of the IDE; or
  at least one output element associated with an output function of the IDE.

18. The non-transitory computer-readable medium if claim 15, wherein the instructions, when executed, further cause storing, in a version control repository, the platform-agnostic data processing job, wherein the version control repository is accessible to each of a data processing job development environment and a data processing job production environment.

19. The non-transitory computer-readable medium if claim 15, wherein the creating the platform-specific data processing job comprises creating the platform-specific data processing job further using a view definition that defines, for a target data source, a first data view that corresponds to a second data view of a second data source.

20. The non-transitory computer-readable medium if claim 15, wherein the instructions, when executed, further cause:
  receiving a data source-agnostic data query comprising a data source alias; and
  creating, for a target data source, a data source-specific data query at least by replacing, using an alias mapping and based on the target data source, the data source alias with a data source identifier that indicates the target data source;
  wherein the creating the restricted platform-specific data processing job comprises creating the restricted platform-specific data processing job further based on the data source-specific data query; and
  wherein the alias mapping comprises at least one of:
    a first mapping between a first data source alias and a first data source identified of a first data source comprising a data warehouse of structured data; or
    a second mapping between a second alias and a second data source identifier of a second data source comprising a data lake of unstructured data; and
  wherein the target data processing platform accesses, during execution of the unrestricted platform-specific data processing job and based on the data source-specific data query, the target data source.

* * * * *